(12) United States Patent
Evans et al.

(10) Patent No.: US 8,890,501 B2
(45) Date of Patent: Nov. 18, 2014

(54) SYSTEM AND METHOD FOR SOFT-STARTING A POWER CONVERTER WITH A PRE-CHARGED OUTPUT

(75) Inventors: Shawn D. Evans, Raleigh, NC (US); Bogdan M. Duduman, Raleigh, NC (US); Cindy C. Manion, Palm Bay, FL (US)

(73) Assignee: Intersil Americas, LLC, Milpitas, CA (US)

( * ) Notice: Subject to any disclaimer, the term of this patent is extended or adjusted under 35 U.S.C. 154(b) by 220 days.

(21) Appl. No.: 13/359,407

(22) Filed: Jan. 26, 2012

(65) Prior Publication Data

US 2012/0206121 A1    Aug. 16, 2012

Related U.S. Application Data

(60) Provisional application No. 61/441,784, filed on Feb. 11, 2011, provisional application No. 61/576,174, filed on Dec. 15, 2011.

(51) Int. Cl.
 *G06F 1/00* (2006.01)
 *H02M 1/36* (2007.01)
 *H02M 3/156* (2006.01)

(52) U.S. Cl.
 CPC ............... *H02M 1/36* (2013.01); *H02M 3/156* (2013.01)
 USPC .......................................... 323/284; 323/288

(58) Field of Classification Search
 USPC ................. 323/222, 224, 282–290, 311–316; 363/49, 56.01, 21.13, 21.14, 21.16, 72, 363/81, 95, 96
 See application file for complete search history.

(56) References Cited

U.S. PATENT DOCUMENTS

| | | | |
|---|---|---|---|
| 5,264,782 A * | 11/1993 | Newton | 323/288 |
| 5,610,503 A * | 3/1997 | Fogg et al. | 323/283 |
| 5,627,460 A * | 5/1997 | Bazinet et al. | 323/288 |
| 5,869,935 A * | 2/1999 | Sodhi | 315/225 |
| 7,145,316 B1 * | 12/2006 | Galinski, III | 323/288 |
| 8,497,666 B2 * | 7/2013 | Nagasawa | 323/238 |
| 8,502,511 B1 * | 8/2013 | Kung | 323/225 |
| 2007/0177412 A1 * | 8/2007 | Sharp | 363/59 |

* cited by examiner

*Primary Examiner* — Rajnikant Patel
(74) *Attorney, Agent, or Firm* — Donald L. Bartels; Bartels Law Group

(57) ABSTRACT

A method for soft-starting a voltage generator includes disabling an output driver; detecting the voltage on an output node; ramping a reference voltage at a controlled rate from a predetermined first level until the reference voltage reaches a second level that is a predetermined function of said output node voltage; enabling the output driver when the reference voltage reaches said second level; and then ramping the reference voltage and the output node voltage at a controlled rate to a boot voltage level. A soft-start circuit for an output voltage generator includes a comparator for causing a ramp generator to ramp the reference voltage and the voltage on the output node to a boot voltage level at a controlled rate once the comparator detects that the reference voltage is substantially equal to the voltage on the output node.

21 Claims, 8 Drawing Sheets

SYSTEM AND METHOD FOR SOFT-STARTING A POWER CONVERTER WITH A PRE-CHARGED OUTPUT

CLAIM OF PRIORITY

This application claims priority to U.S. Provisional Application Ser. No. 61/441,784, filed on Feb. 11, 2011, and U.S. Provisional Application Ser. No. 61/576,174, filed on Dec. 15, 2011, both of which are incorporated herein by reference.

BRIEF DESCRIPTION OF THE DRAWINGS

The features, advantages, and benefits of the present invention will become more apparent from the following description taken in conjunction with the accompanying drawings, which are presented solely for exemplary purposes and not with the intent to limit the invention thereto, and in which.

DETAILED DESCRIPTION OF THE INVENTION

The following description is presented to enable one of ordinary skill in the art to make and use the present invention as provided within the context of a particular application and its requirements. Various modifications to the embodiments described will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
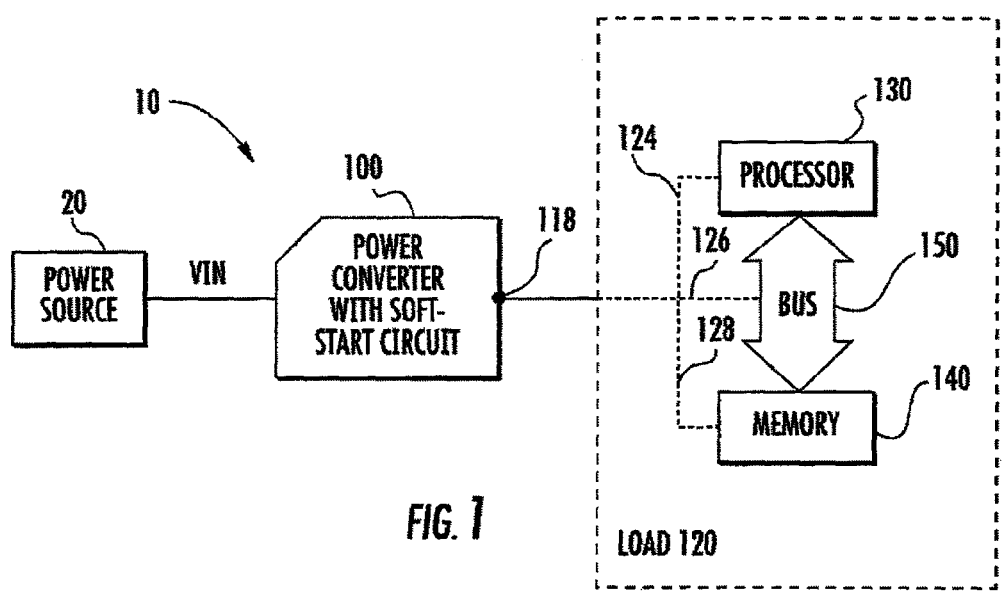
FIG. 1 illustrates a system that incorporates a soft-start circuit that compensates for a pre-biased (aka pre-charged) output load.

FIG. 1 is schematic and block diagram of a voltage generator, implemented as a power supply or converter 100, which contains a soft-start circuit according to one embodiment of the invention, in an exemplary system 10, e.g., a computer or telecommunications system. Power converter 100 includes a conventional DC to DC switch mode power converter used to provide a regulated output voltage VOUT at a node 118 for supplying power to a load 120. As shown in FIG. 1, system 10 includes a power source 20 coupled to power converter 100. Power source 20 may be a conventional AC to DC power supply, a battery, or another power source known in the art. The load 120 may be one or more of a processor 130, memory 140, a bus 150, a combination of two or more of the foregoing, or some other load. Voltage VOUT is shown schematically with dotted lines 124, 126, and 128 coupled to processor 130, memory 140, and bus 150, respectively. Processor 130 may be one or more of a microprocessor, microcontroller, embedded processor, digital signal processor, or other processing system known in the art. In one embodiment, processor 130 is coupled to memory 140 by bus 150. Memory 140 may be one or more of a static random access memory, a dynamic random access memory, a read only memory, a flash memory, or other memory. Bus 150 may be one or more of an on-chip (integrated circuit implemented) bus, an off-chip bus, or another bus known in the art. Processor 130, memory 140, and bus 150 may be incorporated into one or more integrated circuits and/or other components.

Figure 2:
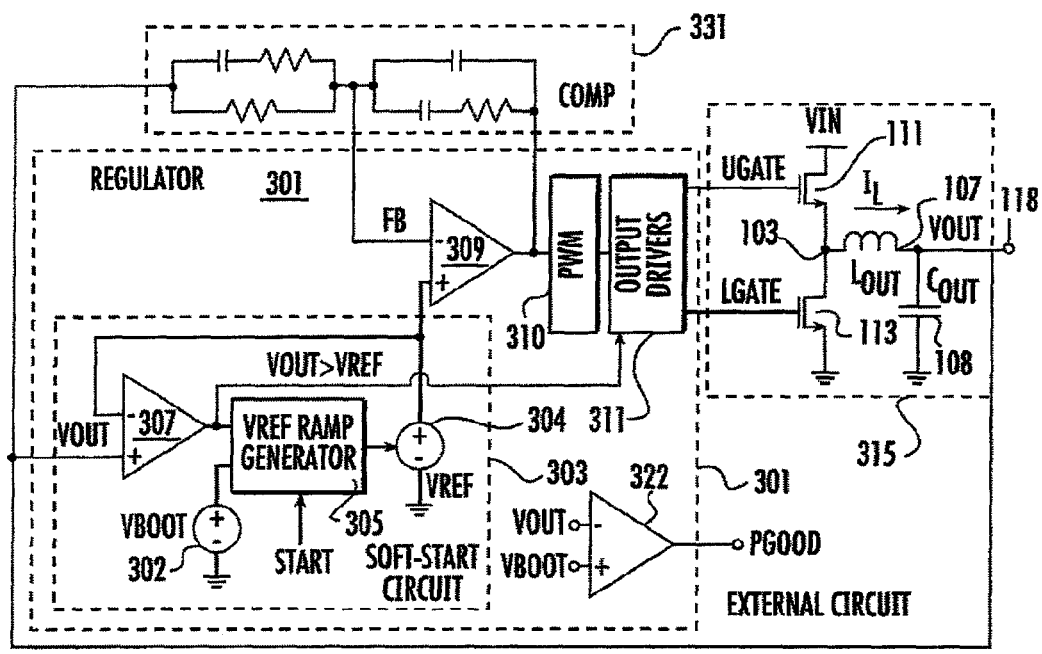
FIG. 2 is a schematic and block diagram of a voltage generator operable to soft-start into a pre-biased output according to one embodiment.

A start-up system according to one embodiment provides a novel approach to soft-starting a voltage generator whose output node or terminal has been pre-biased or pre-charged to an unknown voltage. The new approach works by comparing the output voltage VOUT with a reference voltage VREF. VREF ramps from a first voltage level during start-up until it reaches a second level that is a predetermined function of the output voltage VOUT. VOUT and VREF are then caused to ramp at a controlled rate to a boot voltage level VBOOT. VBOOT is the initial voltage that the voltage regulator is programmed to boot up to on soft-start. FIG. 2 is a schematic and block diagram of an embodiment of a voltage generator 300, operable in one embodiment as a power converter, to soft-start when its output node has been pre-biased or pre-charged. In this embodiment, power converter 300 includes a regulator 301, a DC-DC buck converter 315, and a compensation network 331. The regulator 301 includes a soft-start circuit 303, an error amplifier 309, a pulse width modulator (PWM) 310 and output drivers 311. The modulator 310 generates a pulse width modulation signal (PWM signal) that is coupled to output drivers 311 to drive buck converter 315. Output drivers 311 provides the upper gate (UGATE) and lower gate (LGATE) output signals to control buck converter 315. In the embodiment shown in FIG. 2, buck converter 315 generates an output voltage VOUT whose level is controlled by the duty cycle of the PWM signal. The buck converter 315 includes a pair of electronic switches 111 and 113 each configured in one embodiment as an N-channel metal-oxide semiconductor, field-effect transistor (MOSFET). The electronic switches 111 and 113 have source and drain terminals coupled in series between an input voltage VIN and ground and form an intermediate node 103. The UGATE signal is provided to the gate input of switch 111 and the LGATE signal is provided to the gate input of switch 113. An output inductor 107 ($L_{OUT}$) is coupled between node 103 and an output node or terminal 118. An output capacitor 108 ($C_{OUT}$) is coupled between output node 118 and ground. Output voltage VOUT is generated across capacitor 108. Output drivers 311 alternatively activates in a conventional manner the electronic switches 111 and 113 as a function of the PWM signal to switch intermediate node 103 between VIN and ground to convert VIN to VOUT via inductor 107 and capacitor 108.

Once converter 300 has completed its soft-start operation, converter 300 generates a regulated output voltage VOUT at output node 118 as a function of VREF, for coupling to a load 120 (as seen in FIG. 1). In the illustrated embodiment shown in FIG. 2, voltage VOUT is fed back to the regulator 301 and to the compensation network 331. The compensation network 331 has an intermediate node that develops a feedback signal FB which is provided to one input of error amplifier 309. VREF is coupled to the other input of error amplifier 309. The other end of compensation network 331 is coupled to the output of error amplifier 309. Error amplifier 309 generates a compensation signal COMP which is coupled to an input of modulator 310. The COMP signal is indicative of the relative error of VOUT with respect to VREF and is used by modulator 310 and output drivers 311 to vary the duty cycle of switches 111 and 113 in a conventional manner. That is, the modulator 310 develops a PWM signal based on the COMP signal. The PWM signal is used by output drivers 311 to generate UGATE and LGATE when circuit 311 is not in tri-state mode. In the tri-state mode during start-up, the UGATE and LGATE signals output by the modulator and output drivers 311 are tri-state signals which cause switches 111 and 113 to remain off. In an alternate embodiment, when the soft-start circuit 303 generates a tri-state signal, this signal simply causes output drivers 311 to be disabled, such that no gate signal is coupled to switches 111 and 113.

In one embodiment, the regulator 301 is implemented on an integrated circuit (IC) chip or the like. In this embodiment, the compensation network 331 and buck converter 315 are external circuits. In addition, in the embodiment shown in FIG. 2, output drivers 311 and modulator 310 are separate components. In an alternate embodiment, both components are in a single circuit 311.

Figure 4:
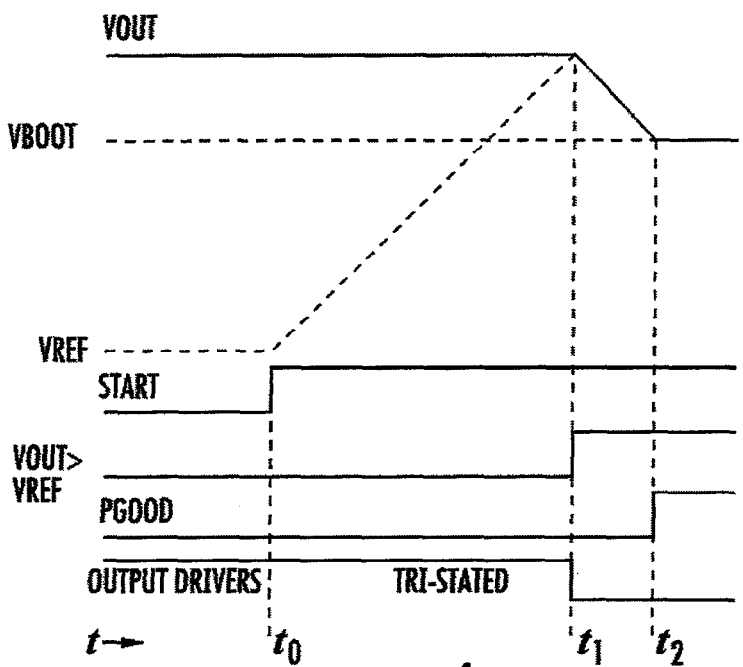
FIG. 4 is a timing diagram illustrating the voltage and logic levels of several signals of the voltage generator of FIG. 2 plotted versus time when soft-starting into a pre-biased output where the output voltage level is initially above the boot-up voltage.
Figure 5:
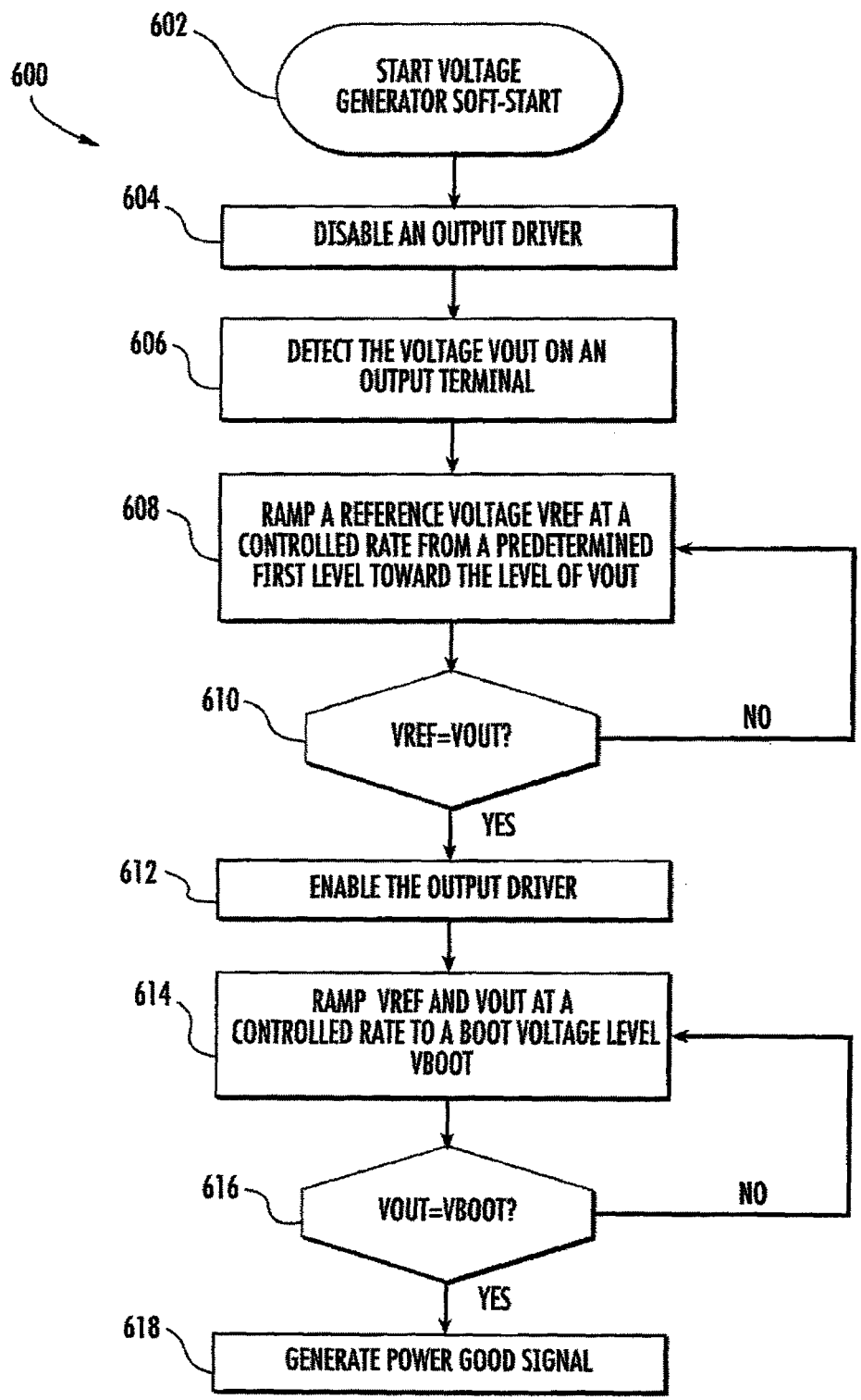
FIG. 5 is a flow chart illustrating an embodiment of a method for soft-starting a voltage generator having a pre-biased output.

The soft-start circuit 303 of power converter 300 shown in FIG. 2 includes a comparator 307, a VREF ramp generator 305, a voltage source 302 for providing the boot voltage VBOOT, and a controllable voltage source 304 for providing a variable VREF. A START signal is coupled to the VREF ramp generator 305 to initiate soft-start operation. The VREF ramp generator 305 has an output coupled to a control input of the voltage source 304 to cause VREF to ramp from an initial voltage, when the START signal is received, toward voltage VOUT. In one soft-start embodiment, the initial voltage level of VREF is ground and VREF is ramped up from this level towards VOUT. The comparator 307 compares VOUT with VREF and outputs a first signal for so long as VOUT>VREF. This signal is fed to the VREF ramp generator 305 and to a tri-state input of output drivers 311. In one embodiment, as seen in FIGS. 4 and 5, first signal VOUT>VREF is generated by comparator 307 while VOUT is a higher voltage than VREF. Comparator 307 generates a second signal when VREF is substantially equal to VOUT. While the first signal is generated, e.g., while the output of comparator 307 is low, output drivers 311 are disabled. Output drivers 311 are enabled when the second signal is generated, e.g., when the output of comparator 307 goes high. In an alternate embodiment, the first signal is generated when VOUT is substantially unequal to VREF and the second signal is generated when the reference voltage VREF reaches a second level that is a predetermined function of VOUT, e.g., when VOUT is substantially equal to VREF.

FIG. 4 is a timing diagram that illustrates the operation of the voltage and logic levels of several signals in the voltage generator 300 of FIG. 2 plotted versus time when soft-starting into a pre-biased output where the voltage level VOUT is above the boot-up voltage VBOOT. As seen in FIG. 4, when start-up begins at $t_0$, the output drivers 311 are tri-stated to disable them and VREF ramps at a controlled rate past VBOOT and does not stop ramping until VREF equals VOUT, shown at $t_1$. Only once VREF equals VOUT are the output drivers 311 "un-tri-stated" or otherwise activated, allowing the voltage generator 300 to begin regulating. VREF and VOUT are then caused to ramp towards VBOOT. When VREF reaches VBOOT, at time $t_2$, soft-start ends and a power good signal, PGOOD, is generated.

Figure 3:
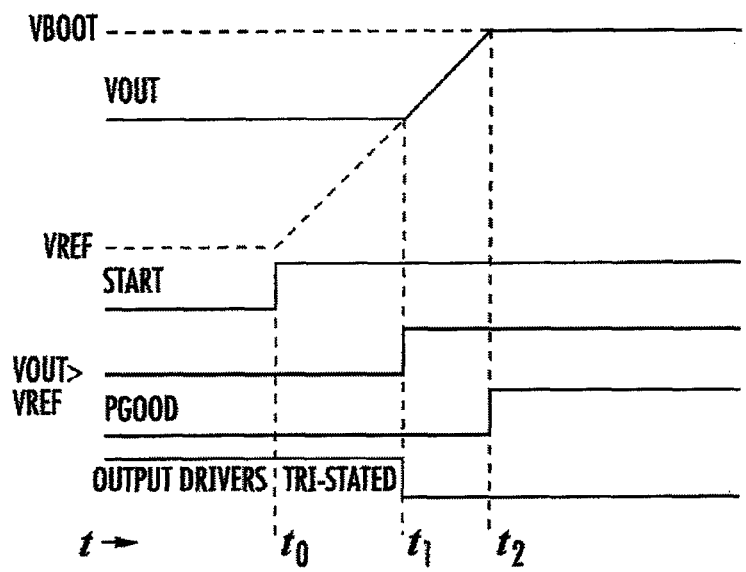
FIG. 3 is a timing diagram illustrating the voltage and logic levels of several signals of the voltage generator of FIG. 2 plotted versus time when soft-starting into a pre-biased output where the output voltage level is initially below the boot-up voltage.

FIG. 3 is a timing diagram that illustrates the operation of the voltage and logic levels of several signals in the voltage generator of FIG. 2 plotted versus time when soft-starting into a pre-biased output where the voltage level VOUT is below the boot-up voltage VBOOT. As shown in FIG. 3, output drivers 105 are again un-tri-stated when VREF reaches VOUT at $t_1$. In this case, however, VREF then continues to ramp up towards VBOOT along with VOUT. When VREF reaches VBOOT, at time $t_2$, soft-start ends and the PGOOD signal is generated.

According to an embodiment of a soft-start method, voltage generator 300 is smoothly soft-started into a pre-biased output without creating any large output inductor current spikes or large output voltage bumps. Because the voltage generator does not begin to regulate VOUT until the reference voltage VREF equals the output load voltage, which is then decreased (FIG. 4) or increased (FIG. 3) at a controlled rate to the boot-up voltage VBOOT, large negative inductor current spikes and output voltage bumps are reduced or otherwise eliminated during start-up. This start-up sequence does not take very long, allowing it to meet typical specified soft-start time limits.

In another embodiment, described below with respect to FIG. 7, the initial voltage level of VREF is high, e.g., just above the overvoltage protection level (OVP) of power converter 300. In this latter embodiment, VREF ramp generator 305 causes VREF to ramp down, and comparator 307 outputs a first signal for so long as VOUT<VREF. This signal is coupled to ramp generator 305 and the tri-state input of output drivers 311.

Returning to the embodiment where VREF is initially at a lower voltage than VOUT, once the START signal is received, VREF ramp generator 305 initiates ramping of VREF. While VOUT>VREF, the output drivers 311 are tri-stated/disabled. When VREF reaches a level that is a function of VOUT (e.g., VREF=VOUT), as detected by comparator 307, the tri-state condition becomes false and the output drivers 311 are un-tri-stated or otherwise activated and begin to operate buck converter 315. At this point, the control loop formed by compensation network 331, error amplifier 309, VREF, modulator 310, output drivers 311, and buck converter 315 begin generating a regulated VOUT. Since VOUT is regulated based on VREF, and since VOUT and VREF are at substantially the same voltage level in one embodiment, there are no uncontrolled spikes in the output inductor current $I_L$ or any large voltage bumps in VOUT. At this point, corresponding to time $t_1$ in FIGS. 4 and 5, VREF ramp generator 305 begins ramping VREF to VBOOT at a controlled rate. When VOUT is less than VBOOT, as seen in FIG. 3, VOUT and VREF are both ramped up together to VBOOT (since the loop regulation keeps VREF and VOUT at about the same voltage). When VOUT is greater than VBOOT as in FIG. 4, VOUT and VREF are both ramped down together to VBOOT at a controlled rate. When VREF and VOUT reach the voltage level of VBOOT, then PGOOD is generated. In one embodiment, PGOOD is generated by a comparator 322 that detects when VOUT equals VBOOT once VREF equals VOUT. In a conventional fashion, a separate control network may be provided to generate a START signal to institute soft-start of the power converter 300.

In an alternate embodiment, comparator 307 can be configured to detect when VREF is equal to a voltage that is a function of voltage VOUT, but not equal to VOUT. In this embodiment, once regulation of VOUT begins, a voltage differential will be maintained between VREF and VOUT corresponding to said function. Alternative converters to buck converter 315 are also contemplated. Other embodiments of the converter 315 include a boost converter, a buck-boost converter, and the like, as is well known in the art.

FIG. 5 is a flow chart illustrating an embodiment of a method for soft-starting a voltage generator having an output that has been pre-biased or pre-charged. As seen in FIG. 5, in the method 600 according to one embodiment, the soft-start of voltage generator 300 begins at 602. The output drivers of the voltage generator are disabled at 604 and the voltage VOUT on an output node or terminal is detected at 606. At 608, a voltage VREF is ramped at a controlled rate from a predetermined first level toward the level of VOUT. The method then determines whether VREF equals VOUT at 610. If not, VREF continues to ramp toward VOUT. Once VREF equals VOUT, the output driver is enabled at 612. At 614, VREF and VOUT are ramped at a controlled rate to a voltage level VBOOT. The method then determines whether VOUT equals VBOOT at 616. If not, VOUT continues to ramp toward VBOOT. The method continues until VOUT equals VBOOT. In one alternative embodiment, once VOUT equals VBOOT, a power good signal is generated at 618.

Figure 6:
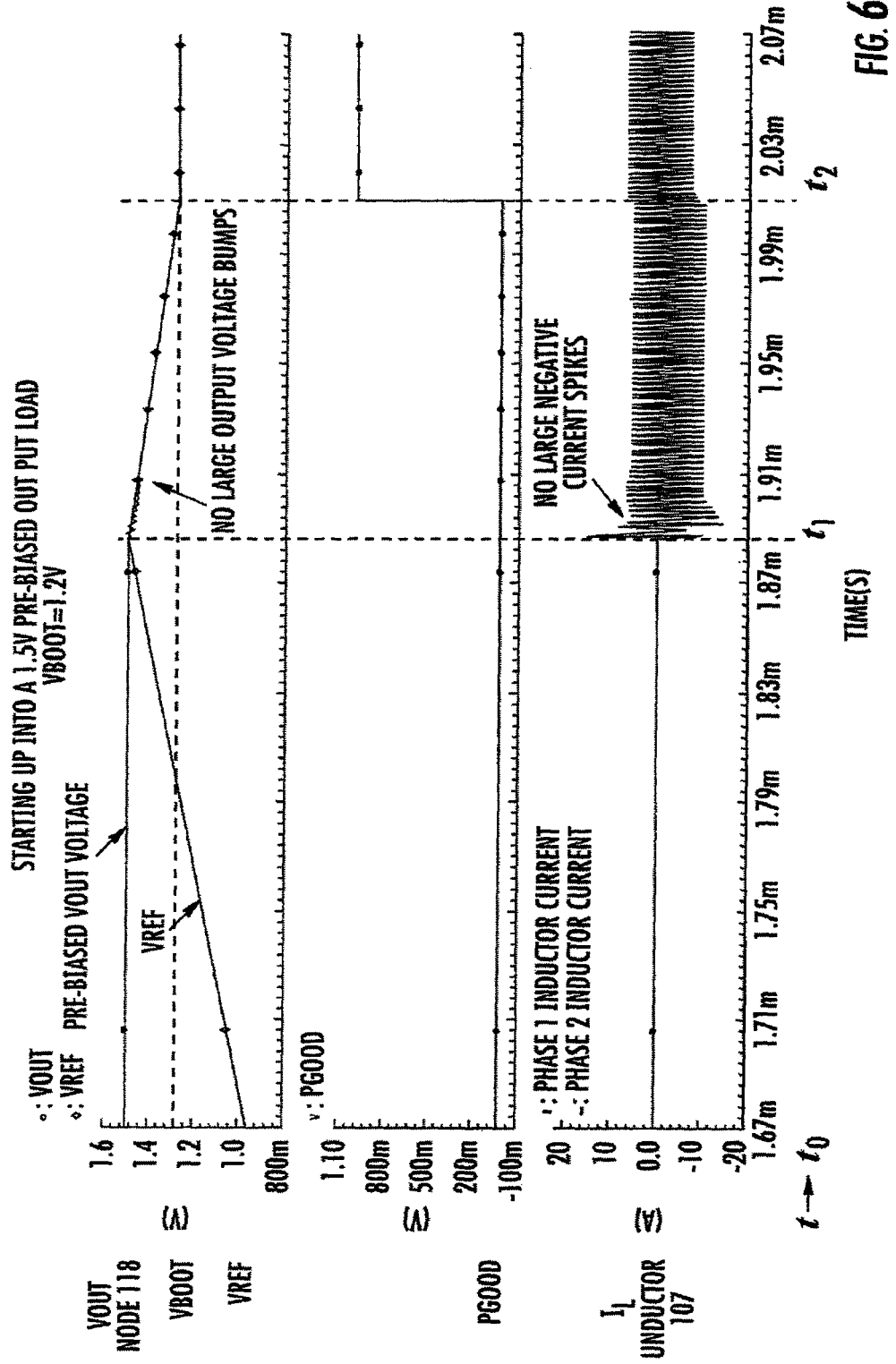
FIG. 6 is a timing diagram illustrating a simulation of the ramp voltage, output voltage, output inductor current, and "power good" signal associated with the voltage generator of FIG. 2 when soft-starting into a pre-biased output comprising a 1.5V pre-biased output voltage (VOUT) where the boot-up voltage (VBOOT) is 1.2V.

FIG. 6 is a timing diagram illustrating a simulation of the ramp voltage, output voltage, output inductor 107 current, and power good PGOOD signal associated with the voltage generator of FIG. 2 when soft-starting into a 1.5V pre-biased output voltage (VOUT) on node 118 where the boot-up voltage (VBOOT) is 1.2V. As seen in FIG. 6, at time $t_0$, VREF begins ramping up from below 1.0 volts. At $t_1$, PGOOD is low and current $I_L$ through inductor 107 is at 0 amps since output drivers 311 are tri-stated/disabled. VREF continues to ramp up until it reaches the 1.5 volt level of VOUT at time $t_1$. At $t_1$, the output drivers 311 are un-tri-stated and switches 111 and 113 begin to operate. This causes the level of VOUT to ramp down at a controlled rate towards the level of VBOOT. That is, starting at $t_1$, with switches 111 and 113 operating, current begins to flow through inductor 107. As is seen, no large current spikes are generated through inductor 107. At time $t_2$, VOUT equals VBOOT. Since the ramping of VOUT to VBOOT has been at a controlled rate, no voltage bumps are generated on VOUT at $t_2$. With VOUT equal to VBOOT, the PGOOD signal goes high. In one embodiment, PGOOD indicates to the load 120 being supplied by voltage generator 300 that VOUT is now in regulation at a voltage level corresponding to VBOOT.

Figure 7:
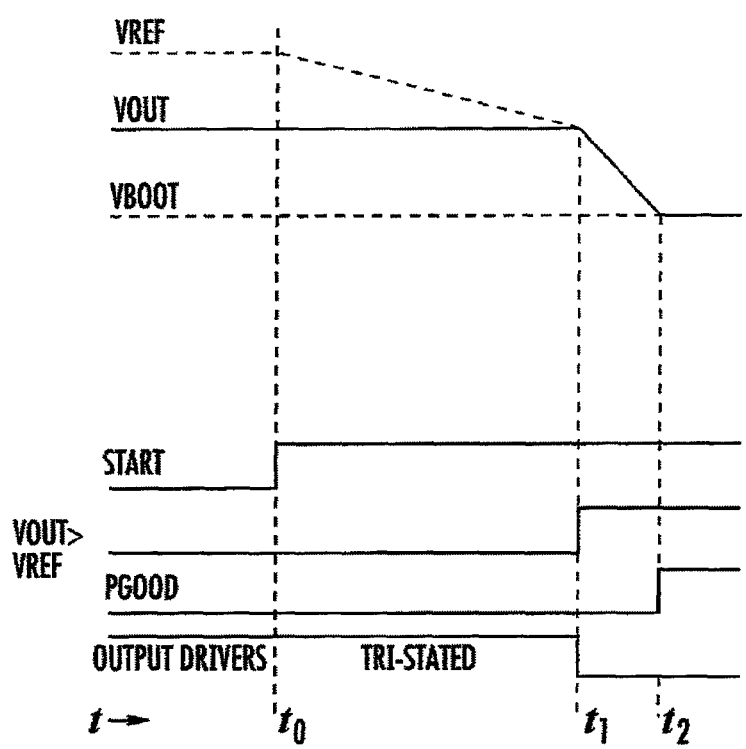
FIG. 7 is a timing diagram illustrating the voltage and logic levels of several signals of the voltage generator of FIG. 2 plotted versus time when soft-starting into a pre-biased output where the output voltage level is initially above the boot-up voltage and where VREF is ramped down from a predetermined voltage greater than VBOOT or VOUT.

FIG. 7 is a timing diagram illustrating the voltage and logic levels of several signals of the voltage generator of FIG. 2 plotted versus time when soft-starting into a pre-biased output where the voltage level VOUT is initially above the boot-up voltage and where VREF is ramped down from a predetermined voltage greater than VBOOT or VOUT. In this embodiment, at time $t_0$, the reference voltage VREF is soft-started down from a higher voltage level, e.g., corresponding to just above the power converter's over-voltage protection (OVP) level, rather than soft-started up from a predetermined lower voltage level, e.g. ground. In this alternate embodiment, the output voltage VOUT is compared to the boot voltage VBOOT prior to soft-start commencement. If the output voltage VOUT is pre-biased at a level that is above VBOOT, the output drivers are kept tri-stated until VREF reaches the level of output voltage VOUT, as seen at $t_1$. Then, the output drivers are un-tri-stated and VREF continues ramping at a controlled rate towards voltage VBOOT and causes VOUT to do the same. This ramp is in a downward direction if VBOOT is below the voltage VOUT, as shown (or switches direction and ramps up, if VBOOT is above the voltage VOUT), until VOUT equals VBOOT at $t_2$.

Figure 8:
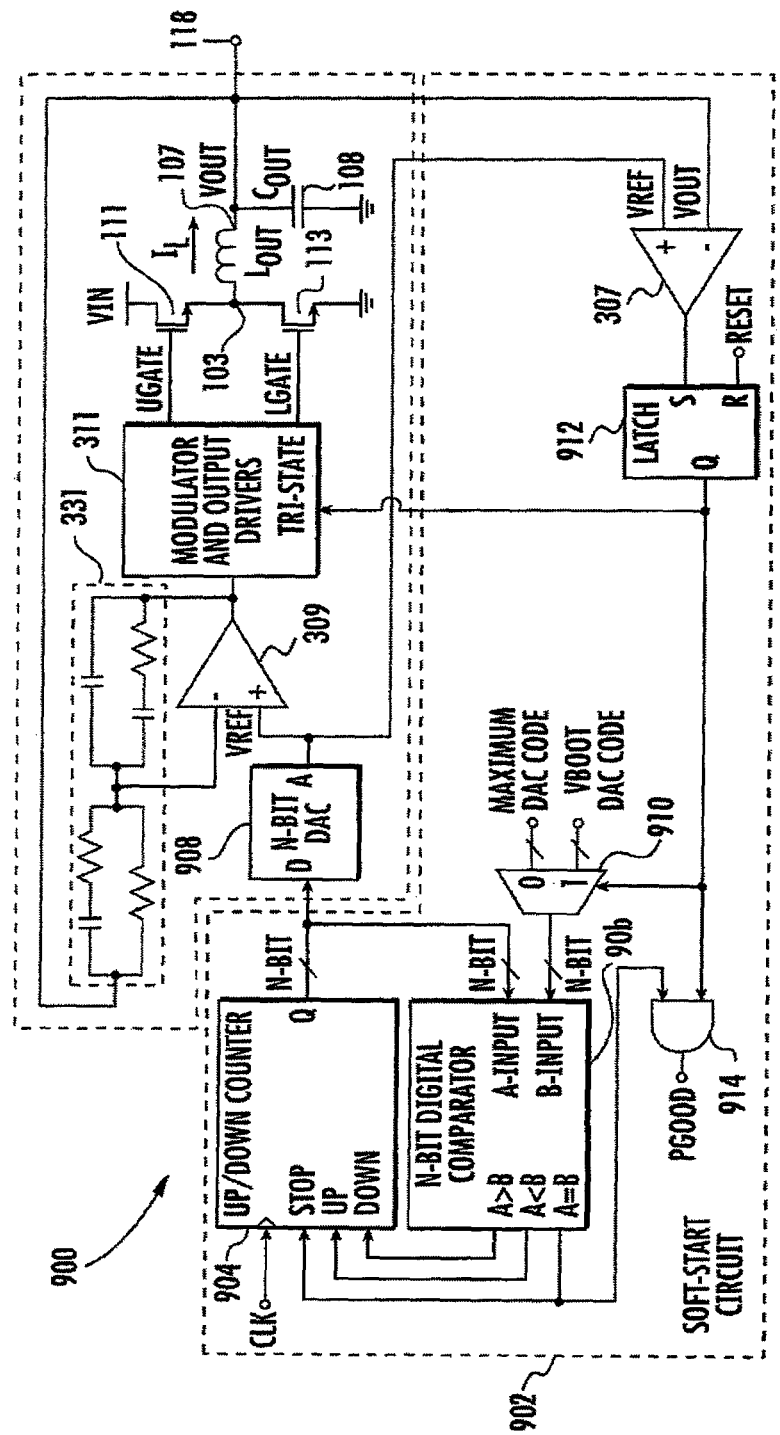
FIG. 8 is a schematic and block diagram of a voltage generator operable to soft-start into a pre-biased output according to another embodiment.

FIG. 8 is a schematic and block diagram of a voltage generator 900 operable to soft-start into a pre-biased load according to another embodiment. In FIG. 8, components that correspond to like components in FIG. 2 have the same numbers. As seen in FIG. 8, the soft-start circuit 902 according to one embodiment includes an n-bit digital counter 904 and a digital comparator 906. Digital counter 904 outputs a sequence of numbers that either go up or down in count, depending on the outputs of digital comparator 906. This sequence of numbers is coupled to a digital to analog converter (DAC) 908 which generates the ramping voltage VREF. The rate of the voltage ramping is controlled by the frequency of a clock signal CLK that is input to digital counter 904. In one embodiment, the ramp rate of voltage VREF is linear.

In operation, the n-bit number to be counted to is fed to the B-input of digital comparator 906. The output count generated by digital counter 904 is fed to the A-input of digital comparator 906. During soft-start, this n-bit number can be one of two predetermined values, either the DAC count number corresponding to the voltage level of VBOOT, or the DAC count number corresponding to a maximum DAC 908 output voltage level. A gate 910 determines which of these count numbers is fed to digital comparator 906. In one embodiment, gate 910 is a conventional multiplexer circuit. The output of gate 910 causes comparator 906 and counter 904 to force the DAC 908 to output a reference voltage VREF that ramps all the way up to the maximum possible DAC 908 voltage, or ramps to the predetermined VBOOT voltage. The soft-start circuit 902 determines which of these voltages to ramp to by comparing VREF to the output voltage VOUT via comparator 307. Initially, a set/reset flip-flop latch 912 is in a reset state, such that its output Q is low. If VREF is below VOUT, comparator 307 stays low and so flip-flop 912 remains reset. This causes digital counter 904 to count to the maximum DAC 908 voltage value via gate 910. The Q output is also fed to the tri-state input of the modulator and output drivers 311 and causes this circuit to keep switches 111 and 113 off. In one embodiment, when the maximum DAC count number is fed to digital comparator 906, this causes DAC 908 to create a VREF that is steadily increasing at a controlled rate.

Once VREF has reached the level of output voltage VOUT, comparator 307 trips and sets flip-flop latch 912. The setting of latch 912 causes gate 910 to switch, thereby causing digital comparator 906 and digital counter 904 to count to the DAC count number corresponding to VBOOT. At the same time, latch 912 also causes the modulator and output drivers 311 to un-tri-state, which causes the voltage regulator 900 to start regulating the output voltage VOUT to the reference voltage VREF. If the DAC 908 is currently outputting a VREF that is at a level below the VBOOT level, counter 904 will count up to the DAC count number corresponding to VBOOT. If the DAC 908 is currently outputting a VREF that is at a level above the VBOOT level, counter 904 will count down to the DAC count number corresponding to VBOOT. Once the DAC count number corresponding to the VBOOT level is reached by counter 904, the PGOOD signal is caused to go high via an AND gate 914.

In another embodiment, counter 904, comparator 906, and DAC 908 can be replaced with a conventional analog ramp circuit. In this embodiment, the output of gate 910 can be used to cause the ramp circuit to either ramp to the maximum allowable voltage, or to the VBOOT voltage. Other configurations known to those skilled in the art can also be used for controlling an analog ramp circuit according to the present invention.

Figure 9:
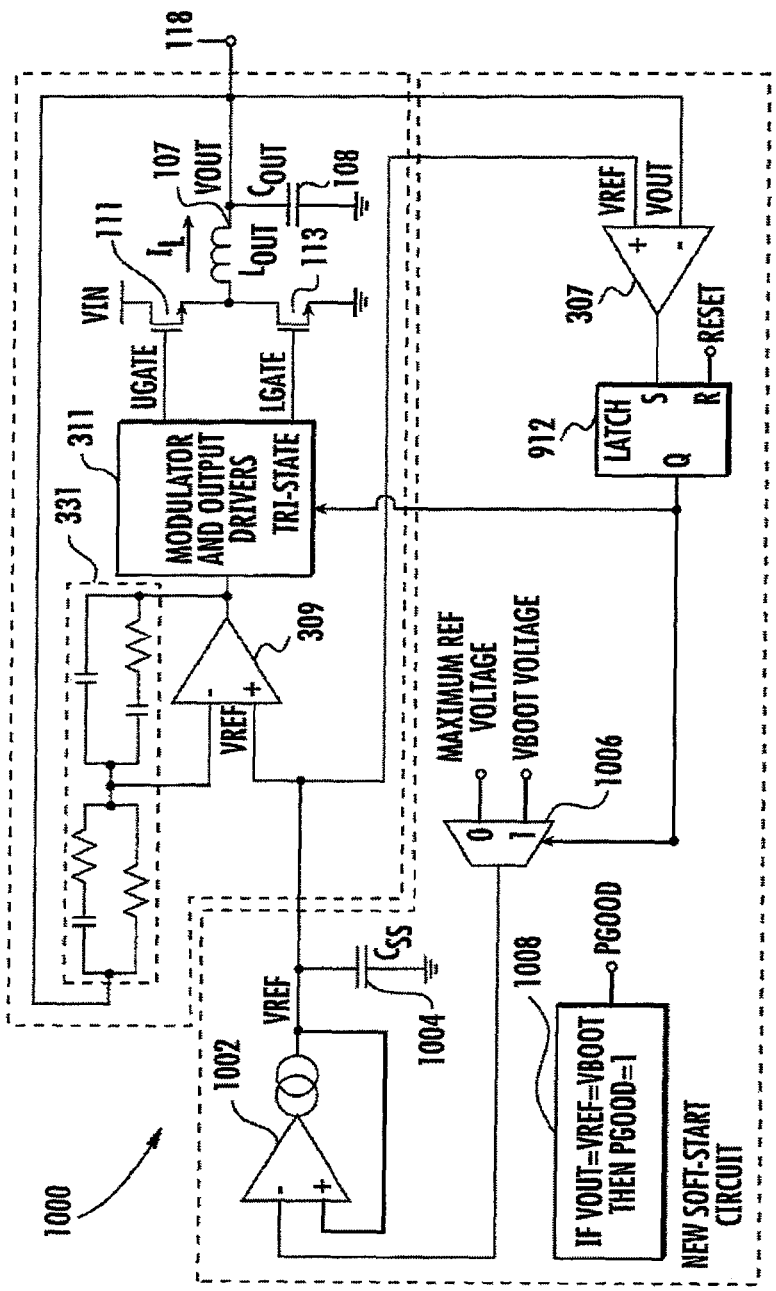
FIG. 9 is schematic and block diagram of a voltage generator operable to soft-start into a pre-biased load according to another embodiment.

FIG. 9 is schematic and block diagram of a voltage generator operable to soft-start into a pre-biased load according to another embodiment. In FIG. 9, components that correspond to like components in FIG. 8 have the same numbers. As seen in FIG. 9, a transconductance amplifier 1002 sources or sinks a current, Iss, into capacitor Css, shown at 1004, to create a voltage ramp that has a dv/dt=Iss/Css. An analog multiplexer 1006 is used to decide whether transconductance amplifier 1002 should ramp to a maximum reference voltage, or to a boot voltage. A PGOOD signal is generated by an analog AND gate 1008 when VOUT=VREF=VBOOT. Circuit 1000 operates similarly to the circuit 900 shown in FIG. 8 which uses a DAC to create the VREF ramp voltage, but where the DAC 908, digital counter 904, and digital comparator 906 have been replaced with the transconductance amplifier 1002.

The present invention has been described in relation to particular examples, which are intended in all respects to be illustrative rather than restrictive. Those skilled in the art will appreciate that many different combinations of circuits will be suitable for practicing the present invention. Moreover, other implementations of the invention will be apparent to those skilled in the art from consideration of the specification and practice of the invention disclosed herein. It is intended that the specification and examples described therein be considered as exemplary only, with the true scope of the invention being indicated by the following claims.

What is claimed is:

1. A method for soft-starting a voltage generator comprising:
   disabling an output driver;
   detecting the voltage on an output node;
   ramping a reference voltage at a controlled rate from a predetermined first level until the reference voltage reaches a second level that is a predetermined function of said output node voltage;
   enabling the output driver when the reference voltage reaches said second level; and
   ramping the reference voltage and the output node voltage at a controlled rate to a boot voltage level.

2. The method of claim 1, wherein said second level is equal to the output node voltage.

3. The method of claim 1, wherein, once the reference voltage reaches said second level, the reference voltage is ramped down to said boot voltage level if said output node voltage is greater than said boot voltage level and is ramped up to said boot voltage level if said output node voltage is less than said boot voltage level.

4. The method of claim 1, wherein, once said reference voltage is ramped to said boot voltage level, a power good signal is generated.

5. The method of claim 1 further comprising generating a start signal to start the ramping of said reference voltage from said first level.

6. The method of claim 1 wherein said first level is ground.

7. The method of claim 1 wherein said first level is a voltage above said second level and said boot voltage level.

8. A soft-start circuit for an output voltage generator having an output node comprising:
   an output driver;
   a first voltage generator for generating a reference voltage;
   a ramp generator for causing the first voltage generator to ramp the reference voltage at a controlled rate starting from a predetermined first voltage level; and
   a first comparator for comparing the voltage on said output node and said reference voltage and for generating a first signal when the voltage on said output node is substantially unequal to said reference voltage and a second signal when the voltage on said output node is substantially equal to said reference voltage, said first signal causing said output driver to be disabled, and said second signal causing said ramp generator to ramp the reference voltage to a boot voltage level and enabling said output driver to cause the voltage on said output node to ramp at a controlled rate to said boot voltage level.

9. The soft-start circuit of claim 8 wherein, in response to said second signal, said output driver causes the voltage on said output node to ramp to said boot voltage level at substantially the same rate as said reference voltage.

10. The soft-start circuit of claim 8 further comprising a second comparator for generating a power good signal when the voltage on said output node substantially equals said boot voltage level.

11. The soft-start circuit of claim 8, wherein, once the reference voltage is substantially equal to the voltage on said output node, said ramp generator causes the reference voltage to ramp down to said boot voltage level if said output node voltage is greater than said boot voltage level and causes the reference voltage to ramp up to said boot voltage level if said output node voltage is less than said boot voltage level.

12. The soft-start circuit of claim 8, wherein said ramp generator starts ramping from a predetermined first voltage level in response to receipt of a start signal.

13. The soft-start circuit of claim 8, wherein said predetermined first voltage level is ground.

14. The soft-start circuit of claim 8, wherein said predetermined first voltage level is a voltage above the voltage on said output node and above said boot voltage level.

15. The soft-start circuit of claim 8, wherein said output voltage generator comprises a DC-DC power converter.

16. The soft-start circuit of claim 8, wherein said output voltage generator further comprises a buck converter for generating the output voltage at said output node, a compensation circuit, and a pulse width modulator, said compensation circuit for generating a compensation signal that is a function of the extent to which the voltage on said output node is above or below said reference voltage, and said pulse width modulator for generating a pulse width modulated signal responsive to said compensation signal that is coupled to said output driver which generates a drive signal for controlling the operation of said buck converter.

17. The soft-start circuit of claim 8, wherein said first voltage generator is a digital to analog converter, and wherein said ramp generator comprises a digital comparator and a digital up/down counter.

18. The soft-start circuit of claim 17, wherein said boot voltage level comprises a predetermined count of said digital counter, and wherein said digital comparator causes said digital counter to stop counting when the current count of said digital counter equals said boot voltage level count.

19. The soft-start circuit of claim 8, wherein said first voltage generator is a transconductance amplifier and a capacitor connected between the output of said transconductance amplifier and ground, and wherein said ramp generator comprises an analog multiplexer for determining whether the output of the transconductance amplifier ramps to a maximum reference voltage or to said boot voltage level.

20. A system comprising:
- a power converter that converts an input voltage to a regulated output voltage at an output node;
- a load coupled to said output node; and
- a soft-start circuit for soft starting said power converter, comprising:
- an output driver;
- a first voltage generator for generating a reference voltage;
- a ramp generator for causing the first voltage generator to ramp the reference voltage at a controlled rate starting from a predetermined first voltage level; and
- a first comparator for comparing the voltage on said output node and said reference voltage and for generating a first signal when the voltage on said output node is greater than said reference voltage and a second signal when the voltage on said output node is substantially equal to said reference voltage, said first signal causing said output driver to be disabled, and said second signal causing said ramp generator to ramp the reference voltage to a boot voltage level and enabling said output driver to cause the voltage on said output node to ramp at a controlled rate to said boot voltage level.

21. The system of claim 20, wherein said load is selected from one of a group consisting of a processor, a memory, and a bus.

* * * * *